United States Patent
Howard

(10) Patent No.: US 10,477,497 B2
(45) Date of Patent: *Nov. 12, 2019

(54) SYNCHRONIZATION IN A FLEXIBLE BANDWIDTH WIRELESS NETWORK

(71) Applicant: Intellectual Ventures II LLC, Wilmington, DE (US)

(72) Inventor: Paul Howard, Bristol (GB)

(73) Assignee: INTELLECTUAL VENTURES II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,296

(22) Filed: Aug. 28, 2017

(65) Prior Publication Data

US 2018/0206201 A1  Jul. 19, 2018

Related U.S. Application Data

(63) Continuation of application No. 15/001,871, filed on Jan. 20, 2016, now Pat. No. 9,749,973, which is a (Continued)

(30) Foreign Application Priority Data

Nov. 14, 2001   (GB) .................................. 0127319.2

(51) Int. Cl.
*H04W 56/00*   (2009.01)
*H04B 1/707*   (2011.01)
*H04W 92/10*   (2009.01)

(52) U.S. Cl.
CPC .......... *H04W 56/001* (2013.01); *H04B 1/707* (2013.01); *H04B 2201/70705* (2013.01); *H04W 92/10* (2013.01)

(58) Field of Classification Search
CPC .... H04W 56/001; H04W 92/10; H04B 1/707; H04B 2201/70705
See application file for complete search history.

(56) References Cited

U.S. PATENT DOCUMENTS

| 5,020,092 A | 5/1991 | Phillips et al. |
| 5,272,694 A | 12/1993 | Bourgart et al. |

(Continued)

FOREIGN PATENT DOCUMENTS

| EP | 0825726 A2 | 2/1998 |
| EP | 1065825 A2 | 1/2001 |

(Continued)

OTHER PUBLICATIONS

*Intellectual Ventures I LLC, et al. v. Motorola Mobility LLC*, Case No. 0:13-cv-61358-RSR (S.D. Fla.), Invalidity Claim Charts for U.S. Pat. No. 7,848,353, Nov. 4, 2014, 75 pages.
*Ericsson Inc.* and *Telefonaktiebolaget LM Ericsson*, Petitioner v. *Intellectual Ventures II LLC*, Patent Owner, Petition for Inter Partes Review, U.S. Pat. No. 7,848,353, Jun. 9, 2014, 66 pages.

(Continued)

*Primary Examiner* — Brian D Nguyen
(74) *Attorney, Agent, or Firm* — McAndrews, Held & Malloy, Ltd.

(57) ABSTRACT

In a wireless network, a primary synchronization signal and a secondary synchronization signal are sent at a predetermined bandwidth in a transmission. The predetermined bandwidth is a lowest operating bandwidth of the wireless network. Data is also sent in the transmission using an operating bandwidth greater than the lowest operating bandwidth.

23 Claims, 4 Drawing Sheets

Related U.S. Application Data continuation of application No. 13/787,115, filed on Mar. 6, 2013, now Pat. No. 9,247,511, which is a continuation of application No. 12/960,774, filed on Dec. 6, 2010, now Pat. No. 8,396,079, which is a continuation of application No. 12/033,824, filed on Feb. 19, 2008, now Pat. No. 7,848,353, which is a continuation of application No. 10/293,635, filed on Nov. 13, 2002, now Pat. No. 7,356,098.

(56) References Cited

U.S. PATENT DOCUMENTS

| | | | |
|---|---|---|---|
| 5,321,721 | A | 6/1994 | Yamaura et al. |
| 5,341,396 | A | 8/1994 | Higgins et al. |
| 5,519,779 | A | 5/1996 | Proctor et al. |
| 5,537,398 | A | 7/1996 | Siwiak et al. |
| 5,629,934 | A | 5/1997 | Ghosh et al. |
| 5,706,428 | A | 1/1998 | Boer et al. |
| 5,726,978 | A | 3/1998 | Frodigh et al. |
| 5,950,124 | A | 9/1999 | Trompower et al. |
| 5,974,106 | A | 10/1999 | Dupont et al. |
| 5,974,319 | A | 10/1999 | Kotzin et al. |
| 6,026,443 | A | 2/2000 | Oskouy et al. |
| 6,175,550 | B1 | 1/2001 | van Nee |
| 6,246,713 | B1 | 6/2001 | Mattison |
| 6,317,597 | B1 | 11/2001 | Baker et al. |
| 6,330,429 | B1 | 12/2001 | He |
| 6,363,060 | B1 | 3/2002 | Sarkar |
| 6,377,809 | B1 | 4/2002 | Rezaiifar et al. |
| 6,463,110 | B1 | 10/2002 | Rinderknecht et al. |
| 6,498,819 | B1 | 12/2002 | Martin |
| 6,526,264 | B2 | 2/2003 | Sugar et al. |
| 6,728,229 | B1 | 4/2004 | Lim |
| 6,785,252 | B1 | 8/2004 | Zimmerman et al. |
| 6,795,451 | B1 | 9/2004 | Giorgetta et al. |
| 6,987,754 | B2 | 1/2006 | Shahar et al. |
| 7,035,292 | B1 | 4/2006 | Giorgetta et al. |
| 7,039,122 | B2 | 5/2006 | Dragonetti |
| 7,080,092 | B2 | 7/2006 | Upton |
| 7,103,085 | B1 | 9/2006 | Dabak et al. |
| 7,106,819 | B1 | 9/2006 | Kaewell, Jr. et al. |
| 7,155,438 | B2 | 12/2006 | Potter et al. |
| 7,158,505 | B2 * | 1/2007 | Dick .................. H04B 1/7083 370/350 |
| 7,170,943 | B1 * | 1/2007 | Van Heeswyk .... H04Q 11/0421 370/329 |
| 7,193,982 | B2 | 3/2007 | Frerking et al. |
| 7,222,148 | B2 | 5/2007 | Potter et al. |
| 7,289,483 | B1 | 10/2007 | Lim |
| 7,324,559 | B2 | 1/2008 | McGibney |
| 7,356,098 | B2 | 4/2008 | Howard |
| 7,397,859 | B2 | 7/2008 | McFarland |
| 7,848,353 | B2 | 12/2010 | Howard |
| 8,396,079 | B2 | 3/2013 | Howard |
| 2001/0021199 | A1 * | 9/2001 | Lee .................... H04B 1/70735 370/503 |
| 2001/0048711 | A1 * | 12/2001 | Sun ...................... H04B 1/707 375/145 |
| 2001/0049272 | A1 | 12/2001 | Hofman |
| 2001/0055320 | A1 | 12/2001 | Pierzga et al. |
| 2002/0021745 | A1 | 2/2002 | Negus |
| 2002/0044538 | A1 * | 4/2002 | Lee .................... H04J 11/0076 370/332 |
| 2002/0064146 | A1 | 5/2002 | Okuyama |
| 2002/0064211 | A1 | 5/2002 | Chen et al. |
| 2002/0146039 | A1 | 10/2002 | Demir et al. |
| 2003/0031162 | A1 * | 2/2003 | Chitrapu ............ H04B 1/70735 370/350 |
| 2003/0072357 | A1 | 4/2003 | Demir et al. |
| 2003/0138066 | A1 | 7/2003 | Jones et al. |
| 2003/0185283 | A1 | 10/2003 | Ho et al. |
| 2003/0202564 | A1 | 10/2003 | Ho et al. |
| 2004/0078440 | A1 | 4/2004 | Potter et al. |
| 2005/0018712 | A1 | 1/2005 | Howard |
| 2013/0259007 | A1 | 10/2013 | Howard |

FOREIGN PATENT DOCUMENTS

| | | |
|---|---|---|
| GB | 2336740 A1 | 10/1999 |
| GB | 2378331 A1 | 2/2003 |
| GB | 2379841 A1 | 3/2003 |
| WO | 9638938 A2 | 12/1996 |

OTHER PUBLICATIONS

*Ericsson Inc.* and *Telefonaktiebolaget LM Ericsson*, Petitioner v. *Intellectual Ventures II LLC*, Patent Owner, Petition fo Inter Partes Review, U.S. Pat. No. 8,396,079, Jun. 9, 2014, 63 pages.
*Google Inc.*, Petitioner v. *Intellectual Ventures II LLC*, Patent Owner, U.S. Pat. No. 7,848,353, Corrected Petition for Inter Partes Review Under 35 U.S.C. §§ 311-319 and 37 C.F.R. § 42.100 Et Seq., Jul. 29, 2014, 69 pages.
K.W. Richardson, UMTS Overview, Electronics & Communication Engineering Journal, Jun. 2000, 9 pages.
Erik Dahlman, et al., UMTS/IMT-2000 Based on Wideband CDMA, IEEE Communications Magazine, Sep. 1998, 11 pages.
File History of U.S. Appl. No. 12/960,774, now U.S. Pat. No. 8,396,079, dated Mar. 12, 2013, Howard, 463 pages.
File History of U.S. Appl. No. 12/033,824, now U.S. Pat. No. 7,848,353, dated Dec. 7, 2010, Howard, 217 pages.
File History of U.S. Appl. No. 10/293,635, now U.S. Pat. No. 7,356,098, dated Apr. 8, 2008, Howard, 483 pages.
File History of EP Application No. 10183191.5-1852, dated May 7, 2013, 120 pages.
David Astely, et al., LTE Part II: 3GPP Release 8, LTE: The Evolution of Mobile Broadband, IEEE Communications Magazine, Apr. 2009, 8 pages.
Curriculum Vitae of Zygmunt J. Haas, Feb. 2014, 42 pages.
*Ericsson Inc.* and *Telefonaktiebolaget LM Ericsson*, Petitioner v. *Intellectual Ventures II LLC*, Patent Owner, U.S. Pat. No. 8,396,079, Declaration of Zygmunt J. Haas, Ph.D. Under 37 C.F.R. § 1.68, Jun. 9, 2014, 101 pages.
*Intellectual Ventures I LLC* and *Intellectual Ventures II LLC* v. *T-Mobile USA, Inc. and T-Mobile US, Inc.*, Complaint Alleging Patent Infringement, Oct. 7, 2013, 15 pages.
*Intellectual Ventures I LLC* and *Intellectual Ventures II LLC* v. *AT&T Mobility LLC, AT&T Mobility II LLC and New Cingular Wireless Services, Inc.*, Plaintiffs' Opposition to Defendants' Motion to Sever, Jan. 10, 2014, 19 pages.
IEEE 100 The Authoritative Dictionary of IEEE Standards Terms, Seventh Edition, published by Standards Information Network IEEE Press, Dec. 2000, 10 pages.
Harry Newton, Newton's Telecom Dictionary, 16th Expanded & Updated Edition, Jul. 2000, 4 pages.
3rd Generation Partnership Project; Technical Specification Group Radio Access Network; High Speed Downlink Packet Access; Overall UTRAN Description (Release 5), 3GPP TR 25.855 V1.0.0 (Jun. 2001), 26 pages.
The HomeRF™ Technical Committee, HomeRF Specification HomeRF, Revision 2.0 Draft 20010402, Apr. 4, 2001, 581 pages.
Comparison of Challenged Claims of the '353 Patent, Jun. 25, 2014, 2 pages.
Expert Declaration of Dr. Vijay Madisetti for Inter Partes Review of U.S. Pat. No. 7,848,353, Jun. 25, 2014, 109 pages.
Expert Declaration of Dr. Kevin Negus for Inter Partes Review of U.S. Pat. No. 7,848,353, Jun. 25, 2014, 90 pages.
*Intellectual Ventures I LLC* and *Intellectual Ventures II LLC* v. *Motorola Mobility LLC*, Complaint for Patent Infringement, Jun. 19, 2013, 19 pages.
Verified Return of Service, Motorola Mobility LLC Serving R/A CT Corporation System, *Intellectual Ventures I LLC* and *Intellectual Ventures II LLC* v. *Motorola Mobility LLC*, 21 Days Summons and Complaint Disclosure Statement/Cover Sheet Exhibit "A, B, C, D, E, F, G", Jun. 25, 2013, 1 page.
Microsoft Press Computer Dictionary, Third Edition, 1997, 2 pages.
Bandwidth—Definition and More from the Free Merriam-Webster Dictionary, Jun. 15, 2014, 1 page.

(56) References Cited

OTHER PUBLICATIONS

*Intellectual Ventures I, LLC* v. *Motorola Mobility LLC*, Plaintiffs Intellectual Ventures I LLC and Intellectual Ventures II LLC's Opening Claim Construction Brief, Case No. 13-cv-61358-Rosenbaum/Hunt, Mar. 7, 2014, pp. 1-30.
TSG-RAN WG1 Meeting #21, Turin, Italy, Aug. 27-31, 2001, DL Signalling for HSDPA, Aug. 28, 2001, 10 pages.
*Ericsson Inc.* v. *Intellectual Ventures II LLC*, Patent Owner Preliminary Response, U.S. Pat. No. 7,848,353, Sep. 19, 2014, 65 pages.
*Ericsson Inc.* v. *Intellectual Ventures II LLC*, Patent Owner Preliminary Response, U.S. Pat. No. 8,396,079, Sep. 19, 2014, 52 pages.
*Google Inc.* v. *Intellectual Ventures II LLC*, Patent Owner Preliminary Response, U.S. Pat. No. 7,848,353, Oct. 22, 2014, 52 pages.
*Ericsson Inc.* and *Telefonaktiebolaget LM Ericsson* v. *Intellectual Ventures II LLC*, Decision Institution of Inter Partes Review, U.S. Pat. No. 7,848,353, Dec. 16, 2014, 26 pages.
*Ericsson Inc.* v. *Intellectual Ventures II LLC*, Decision Institution of Inter Partes Review, U.S. Pat. No. 8,396,079, Dec. 16, 2014, 23 pages.
*Google Inc.* v. *Intellectual Ventures II LLC*, Decision Institution of Inter Partes Review, U.S. Pat. No. 7,848,353, Jan. 20, 2015, 26 pages.
Alfred Baier, Open Multi-Rate Radio Interface Architecture Based on CDMA, 2 Int'l Conf. on Universal Personal Comm'cns. 985 (1993).
Mohr, Werner, "The ULTRA Concept, Europe's Proposal to IMT-2000," Global Telecommunications Conference—Globecom '99 (1999).
IEEE.802.Nov. 1999 Edition, Part 11: Wireless LAN Medium Access Control (MAC) and Physical Layer (PHY) Specifications, ISO/IEC 8802-11: 1999(E), pp. 1-512.
"Physical Layer Standard for cdma2000 Spread Spectrum Systems: Release A," 3rd Generation Partnership Project 2 "3GPP2," C.S0002-A, Version 5.0 (Jul. 13, 2001), 452 pages.
"Defendant's Initial Invalidity Contentions": *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, 187 pages.
Appendix I-Obviousness References for U.S. Pat. No. 7,848,353 (Howard) of Defendants Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, 70 pages.
Appendix J-Obviousness References for U.S. Pat. No. 8,396,079 (Howard) of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, 66 pages.
Exhibit I1 of Appendix I of Defendant's Initial Invalidity Contentions: I*Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 14-1233-LPS), May 4, 2015, pp. 1-32.
Exhibit I2 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671;14-1232; 13-1672; 14-1233-LPS), May 4, 2015, pp. 1-24.
Exhibit I3 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-22.
Exhibit I4 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-12.
Exhibit I5 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-32.
Exhibit I6 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-20.
Exhibit J1 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671;14-1232; 13-1672; 14-1233-LPS), May 4, 2015, pp. 1-33.
Exhibit J2 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-22.
Exhibit J3 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-21.
Exhibit J4 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-11.
Exhibit J5 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-32.
Exhibit J6 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), May 4, 2015, pp. 1-19.
Corrected Exhibit I3 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), Aug. 7, 2015, pp. 1-52.
Corrected Exhibit I4 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), Aug. 7, 2015, pp. 1-37.
Corrected Exhibit I5 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), Aug. 7, 2015, pp. 1-33.
Corrected Exhibit I6 of Appendix I of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), Aug. 7, 2015, pp. 1-21.
Corrected Exhibit J3 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), Aug. 7, 2015, pp. 1-42.
Corrected Exhibit J4 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), Aug. 7, 2015, pp. 1-31.

(56) References Cited

OTHER PUBLICATIONS

Corrected Exhibit J5 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), Aug. 7, 2015, pp. 1-33.
Corrected Exhibit J6 of Appendix J of Defendant's Initial Invalidity Contentions: *Intellectual Ventures I LLC* and *Intellectual Ventures II LLC* v. *AT&T Mobility LLC et al.* (Civil Action Nos. 13-1668; 14-1229; 13-1669; 14-1230; 13-1670; 14-1231; 13-1671; 14-1232; 13-1672; 14-1233-LPS), Aug. 7, 2015, pp. 1-20.
European Patent Application No. 02 779 683.8-1525; Communication Pursuant to Article 94(3) EPC dated Jan. 23, 2008.
Great Britain Search Report dated May 3, 2002, for GB Application No. 0127319.2 filed Nov. 14, 2001, 2 pages.
Hamilton, Graham (Editor), Sun Microsystems JavaBeans, Ver. 1.01, Jul. 24, 1997, pp. 1-114.
"cdma2000—Layer 3 Signaling: Revision A," 3rd Generation Partnership Project 2 "3GPP2," C.S0005-A, Version 5.0 (Jul. 2001), 1696 pages.
Holma, H. et al. (1998). "Physical Layer of Frames Mode 2-Wideband CDMA," 48th IEEE Vehicular Technology Conference, pp. 978-982.
PCT Patent Application No. PCT/GB02/04184; International Search Report dated May 13, 2003.
PCT Patent Application No. PCT/GB2002/005151 filed Nov. 14, 2002; International Search Report dated May 22, 2003, 2 pages.
PCT Patent Application No. PCT/GB2002/005151 filed Nov. 14, 2002; International Preliminary Examination Report dated Jun. 30, 2003, 2 pages.

\* cited by examiner

SYNCHRONIZATION IN A FLEXIBLE BANDWIDTH WIRELESS NETWORK

CROSS REFERENCE TO RELATED APPLICATIONS

This application is a continuation of U.S. patent application Ser. No. 12/960,774 filed Dec. 6, 2010, which is a continuation of U.S. patent application Ser. No. 12/033,824 filed Feb. 19, 2008, which issued as U.S. Pat. No. 7,848,353 on Dec. 7, 2010, which is a continuation of U.S. patent application Ser. No. 10/293,635 filed Nov. 13, 2002, which issued as U.S. Pat. No. 7,356,098 on Apr. 8, 2008, which claims the benefit of United Kingdom Patent Application Serial No. GB 0127319.2 filed Nov. 14, 2001, the contents of which are all hereby incorporated by reference herein.

FIELD OF INVENTION

This invention relates to digital communication systems, and particularly to synchronisation in digital communication systems such as wireless cellular communication systems. The invention finds particular application in modern digital wireless communication to systems such as Universal Mobile Telecommunication Systems (UMTS).

BACKGROUND

It is known that synchronisation is an essential procedure in a modern digital communication system. It is the procedure used by a remote unit (often referred to as User Equipment, UE, in UMTS or Customer Premises Equipment, CPE) to identify valid transmissions from infrastructure equipment (often referred to as Node Bs in UMTS) and align the remote frequency reference and timing to that used by the infrastructure.

UMTS Terrestrial Radio Access (UTRA) Time Division Duplex (TDD) and Frequency Division Duplex (FDD) modes both provide a synchronisation channel (SCH) that is used by the UE to search for valid signals and perform the synchronisation procedure. The SCH transmission consists of one real valued Primary Synchronisation Code (PSC) and three complex Secondary Synchronisation Codes (SSC), all of length 256 chips. The PSC is common for all Node Bs, but the SSCs are Node B specific. The PSC and SSC are transmitted simultaneously from a given Node B at a specific fixed time offset ($t_{offset}$) from the start of time slot 0. The time offset is included to prevent the possible capture effect that would otherwise occur as a consequence of all Node Bs transmitting the common primary code at the same time.

The UE uses the PSC to search for and identify transmissions from Node Bs. The PSC is also used as a reference from which the UE is able to generate a correction that can be used to correct the frequency of the UE's reference oscillator. The SSC is included to signal the additional information required by the UE in order to achieve the full time-aligned synchronization and also to begin to demodulate system information broadcast on the Broadcast Channel (BCH) which is carried by the Primary Common Control Physical Channel P-CCPCH.

For single chip-rate systems where the chip rate used by the Node B and the UE is predetermined by the system design, the synchronization procedure briefly outlined above is sufficiently complete.

However, considering a network where multi-chip rates are supported, in an initial start-up condition, the UE will not be aware of the chip rate that is available; therefore, the receiver in the UE is unable to select the correct chip-rate.

In some known systems such as those using fixed line modems, the available bandwidth is negotiated in the initial data transfers between sender and receiver. This is done at a predetermined fixed rate, usually determined by the system design or backwards compatibility with early implementations.

Other possible schemes might transmit the whole timeslot in which SCH bursts are transmitted at the lower chip-rate (note that for a UMTS TDD system, the SCH is transmitted in every radio frame).

A plurality of subscriber terminals (or user equipment (UE) in UMTS nomenclature 112, 114, 116 communicate over radio links 118, 119, 120 with a plurality of base transceiver stations, referred to under UMTS terminology as Node-Bs, 122, 124, 126, 128, 130, 132. The system comprises many other UEs and Node Bs, which for clarify purposes are not shown.

The wireless communication system, sometimes referred to as a Network Operator's Network Domain, is connected to an external network 134, for example the Internet. The Network Operator's Network Domain includes:

(i) A core network, namely at least one Gateway GPRS Support Node (GGSN) 144 and or at least one Serving GPRS Support Nodes (SGSN); and (ii) An access network, namely:

(ai) a GPRS (or UMTS) Radio network controller (RNC) 136-140; or (aii) Base Site Controller (BSC) in a GSM system and/or (bi) a GPRS (or UMTS) Node B 122-132; or (bii) a Base Transceiver Station (BRTS) in a GSM system.

The GGSN/SGSN 144 is responsible for GPRS (or UMTS) interfacing with a Public Switched Data Network (PSDN) such as the Internet 134 or a Public Switched Telephone Network (PSTN) 134. A SGSN 144 performs a routing and tunnelling function for traffic within say, a GPRS core network, whilst a GGSN 144 links to external.

However, the above known fixed initial rate negotiation scheme and the other possible schemes have the disadvantage that they are inefficient.

A need therefore exists for a synchronisation scheme for multi-rate communication wherein the abovementioned disadvantage may be alleviated.

STATEMENT OF INVENTION

In accordance with a first aspect of the present invention there is provided a method, for synchronisation in a multi-rate communication system, the method comprising:

receiving a signal having a synchronisation portion at a first, predetermined chip rate and containing an indication of chip rate used for a further portion; and recovering the indication from the synchronisation portion at the first, predetermined chip rate; and recovering information in the further portion at the chip rate indicated by the indication.

In accordance with a second aspect of the present invention there is provided a method, for synchronisation in a multi-rate communication system, the method comprising:

transmitting a signal having a sychronisation portion at a first, predetermined chip rate and containing an indication of chip rate used for a further portion.

whereby the indication may be recovered from the synchronisation portion at the first, predetermined chip rate; and information in the further portion may be recovered at the chip rate indicated by the indication.

In accordance with a third aspect of the present invention there is provided a multi-rate communication system comprising:

a transmitter having means for transmitting a signal having a synchronisation portion at a first, predetermined chip rate and containing an indication of chip rate used for a further portion;

a receiver having means for receiving the transmitted signal, means for recovering the indication from the synchronisation portion at the first, predetermined chip rate, and means for recovering information in the further portion at the chip rate indicated by the indication.

In accordance with a fourth aspect of the present invention there is provided a communication unit, for use in a multi-rate communication system, the communication unit comprising:

means for receiving a signal having a synchronisation portion at a first, predetermined chip rate and containing an indication of chip rate used for a further portion;

means for recovering the indication from the synchronisation portion at the first, predetermined chip rate; and means for recovering information in the further portion at the chip rate indicated by the indication.

In accordance with a fifth aspect of the present invention there is provided a communication unit, for use in a multi-rate communication system, the communication unit comprising:

means for transmitting a signal having a synchronisation portion at a first, predetermined chip rate and containing an indication of chip rate used for a further portion, whereby the indication may be recovered from the synchronisation portion at the first, predetermined chip rate; and information in the further portion may be recovered at the chip rate indicated by the indication.

BRIEF DESCRIPTION OF THE DRAWINGS

One method, communication unit and communication system for synchronisation for multi-rate communication incorporating the present invention will now be described by way of example only, with reference to the accompanying drawings, in which.

DETAILED DESCRIPTION OF THE PREFERRED EMBODIMENT

Figure 1:
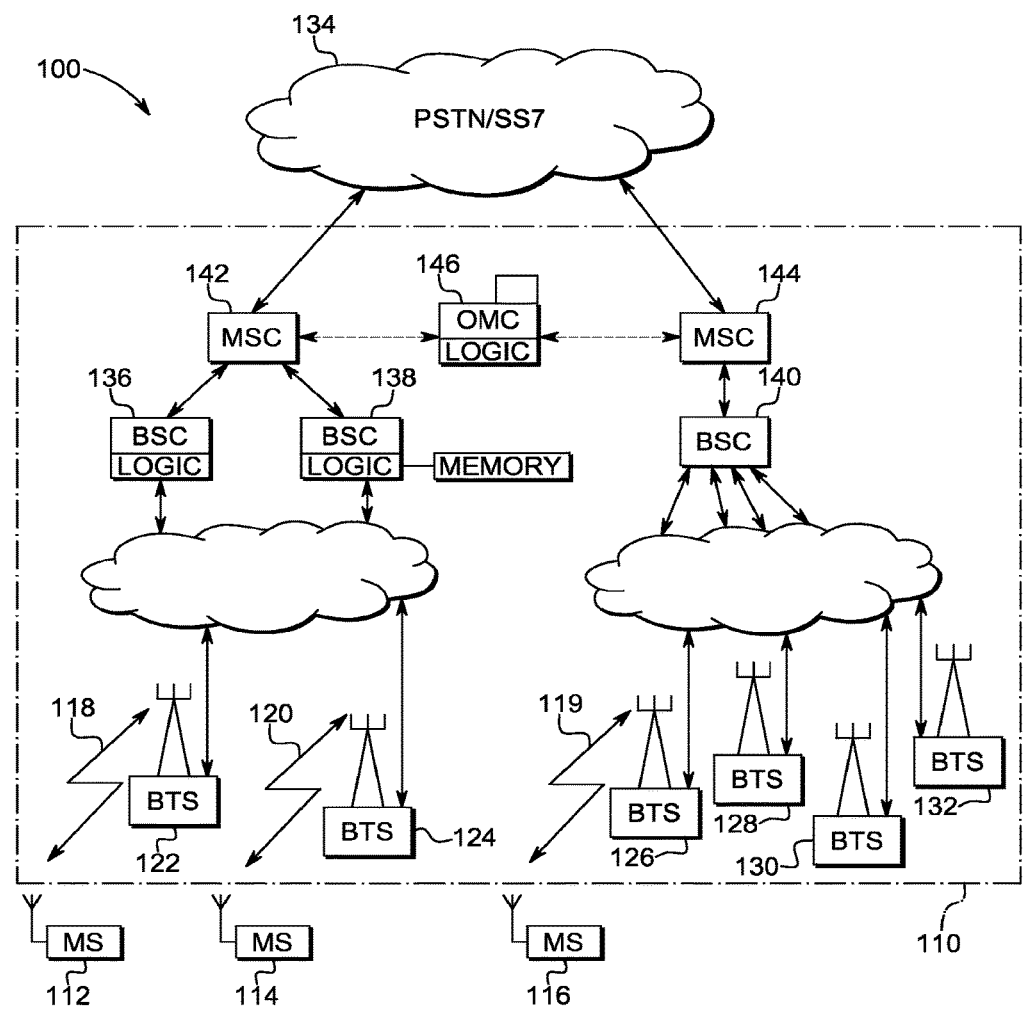
FIG. 1 shows a block diagram of a wireless communication system that can be adapted to support the various inventive concepts of a preferred embodiment of the present invention.

Referring now to FIG. 1, a multi-rate cellular-based wireless telephone communication system 100 is shown in outline, in accordance with a preferred embodiment of the invention. Preferably, the cellular-based telephone communication system 100 compliant with, and contains network elements capable of operating over, a UMTS air-interface. In particular, the invention relates to the Third Generation Partnership Project (3GPP) specification for wide-band code-division multiple access (WCDMA) standard relating to the UTRAN Radio Interface (described in the 3G TS 25.xxx series of specifications).

A plurality of subscriber terminals (or user equipment (UE) in UMTS nomenclature) 112, 114, 116 communicate over radio links 118, 119, 120 with a plurality of base transceiver stations, referred to under UMTS terminology as Node-Bs, 122, 124, 126, 128, 130, 132. The system comprises many other UEs and Node Bs, which for clarity purposes are not shown.

The wireless communication system, sometimes referred to as a Network Operator's Network Domain, is connected to an external network 134, for example the Internet. The Network Operator's Network Domain includes:

(i) A core network, namely at least one Gateway GPRS Support Node (GGSN) 144 and or at least one Serving GPRS Support Nodes (SGSN); and (ii) An access network namely:

(ai) a GPRS (or UMTS) Radio network controller (RNC) 136-140; or (aii) Base Site Controller (BSC) in a GSM system and/or (bi) a GPRS (or UMTS) Node B 122-132; or (bii) a Base Transceiver Station (BTS) in a GSM system.

The GGSN/SGSN 144 is responsible for GPRS (or UMTS) interfacing with a Public Switched Data Network (PSDN) such as the Internet 134 or a Public Switched Telephone Network (PSTN) 134. A SGSN 144 performs a routing and tunnelling function for traffic within say, a GPRS core network, whilst a GGSN 114 links to external pocket networks, in this case ones accessing the GPRS mode of the system.

The Node-Bs 122-132 are connected to external networks, through base station controllers, referred to under UMTS terminology as Radio Network Controller stations (RNC), including the RNCs 136, 13B, 140 and mobile switching centres (MSCs), such as MSC 142 (the others are, for clarity purposes, not shown) and SGSN 144 (the others are, for clarity purposes, not shown).

Each Node-B 122-132 contains one or more transceiver units and communicates with the rest of the cell-based system infrastructure via an $I_{ub}$ interface, as defined in the UMTS specification. Each RNC 136-140 may control one or more Node-Bs 122-132. Each MSC 142 provides a gateway to the external network 134. The Operations and Management Centre (OMC) 146 is operably connected to RNCs 136-140 and Node-Bs 122-132 (shown only with respect to Node-B 126 for clarity). The OMC 146 administers and manages sections of the cellular telephone communication system 100, as is understood by those skilled in the art.

In the preferred embodiment of the invention, at least one UE 112, 114, and 116 and at least one Node-B 122, 124, 126, 128, 130, and 132 have been adapted, to offer, and provide for, transmission, reception and processing of multi-rate high-speed signals generated in accordance with the approach discussed in detail below.

More particularly, in this embodiment the above elements have been adapted to implement the present invention in both transmitting and receiving modes of operation, such that in this embodiment the invention may be applied to both down-link and up-link transmissions.

It is also within the contemplation of the invention that such adaptation of the physical layer (air-interface) elements may alternatively be controlled, implemented in full or implemented in part by adapting any other suitable part of the communication system 100. For example, equivalent parts in other types of systems may, in some circumstances, be adapted to provide some or all of the digital filtering implementation provided in this embodiment.

Further, in the case of other network infrastructures, implementation of the processing operations may be performed at any appropriate node such as any other appropriate type of base station, base station controller, etc.

Alternatively the aforementioned digital filtering operations may be carried out by various components distributed at different locations or entities within any suitable network or system.

Although the preferred embodiment of the invention is described with reference to a wireless communication system employing a UMTS air-interface, it is within the contemplation of the invention that the inventive concepts described herein can be applied to any multi-bandwidth/multi-data rate communication system-fixed or wireless.

Figure 2:
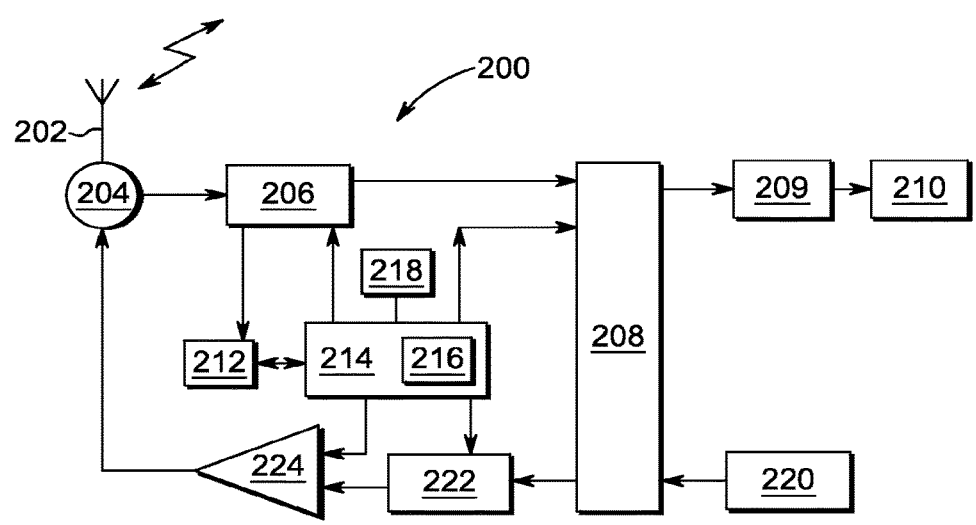
FIG. 2 shows a block diagram of a wireless communication unit that can be adapted to support the various inventive concepts of a preferred embodiment of the present invention.

Referring now to FIG. 2, a block diagram of a communication unit 200, for example user equipment (UE) 112, adapted to support the inventive concepts of the preferred embodiments of the present invention, is shown. However, it is within the contemplation of the invention that a similar block diagram would apply to a Node B element, say Node B 122. Therefore, in the following description FIG. 2 is described such that it also encompasses an implementation of a Node B baseband processing circuit, in broad principle, as would be appreciated by a person skilled in the art.

The UE 112 contains an antenna 202 preferably coupled to a duplex filter or circulator or switch 204 that provides isolation between receive and transmit chains within UE 112.

The receiver chain includes scanning receiver front-end circuitry 206 (effectively providing reception, filtering and intermediate or baseband frequency conversion). The scanning front-end circuit 206 scans signal transmissions from its associated Node B. The scanning front-end circuit 206 is serially coupled to a signal processing function (processor, generally realised by a DSP) 208. The final receiver circuits are a baseband back-end circuit 209 operably coupled to a display unit 210, if the communication unit is a subscriber unit.

Alternatively, if the communication unit is a Node B, the final receiver circuits are a baseband back-end circuit 209 operably coupled to an interface port 210, in order to forward the demodulated received signal to, say a PC or a RNC.

In accordance with a preferred embodiment of the invention, the receiver chain, in particular the signal processing function 208, coupled to the scanning baseband back-end circuit 209, has been adapted for a receiving communication unit to receive and process multiple, high-speed signals of varying bandwidths.

A controller 214 is operably coupled to the scanning front-end circuitry 206 so that the receiver can calculate receive bit-error-rate (BER) or frame-error-rate (PER) or similar link-quality measurement data from recovered information via a received signal strength indication (RSSI) 212 function. The RSSI 212 function is operably coupled to the scanning front-end circuit 206. A memory device 216 in the controller 214 stores a wide array of UE-specific data, such as decoding/encoding functions, timing details, neighbour and serving cell information relating to timing, channels, power control and the like, as well as link quality measurement information to enable an optimal communication link to be selected.

A timer 218 is operably coupled to the controller 214 to control the timing of operations namely the transmission or reception of time-dependent signals, within the UE 112.

In the context of the preferred embodiment of the present invention, timer 218 is used to synchronize the timing of the receiving communication unit 200 to be able to switch between two or more filter configurations, as will be described below, as well as to co-ordinate appropriate clocking of signals throughout the receiver.

For completeness, in broad terms, the transmit chain of the communication unit (either a UE or Node B) essentially includes an input device 220, coupled in series through the processor 208, transmitter/modulation circuitry 222 and a power amplifier 224. The processor 208, transmitter/modulation circuitry 222 and the power amplifier 224 are operationally responsive to the controller 214, with an output from the power amplifier coupled to the duplex filter or circulator 204, as known in the art.

The signal processor function 208 in the transmit chain may be implemented as distinct from the processor in the receive chain. Alternatively, a single processor 208 may be used to implement processing of both transmit and receive signals, as shown in FIG. 2.

Of course, it will be understood that the various components within the communication unit 200 can be realised in discrete or integrated component form, with an ultimate structure therefore being merely an arbitrary selection.

More generally, the digital filtering algorithms associated with the preferred embodiment of the present invention may be implemented in a respective communication unit in any suitable manner. For example, new apparatus may be added to a conventional communication unit (for example UE 112, or Node B 122), or alternatively existing parts of a conventional communication unit may be adapted, for example by reprogramming one or more processors therein. As such the required adaptation may be implemented in the form of processor-implementable instructions stored on a storage medium or data carrier, such as a floppy disk, hard disk, PROM, RAM or any combination of these or other storage multimedia.

This invention, at least in a preferred form, implements a scheme where the SCH channel in the UTRA air-interface is transmitted at the lowest chip-rate supported by the system design. Note that only the SCH channel is always transmitted at the lower chip rate.

As the SCH is transmitted at the lower chip rate, the receiving UE will by default, select the receiver bandwidth, appropriate to this lower chip-rate. In this configuration, the UE will be able to recover the SCH, irrespective of the chip rate used at the transmitting Node B.

The modulation of data onto the secondary SCH defined by the UTRA standard does not use all of the degrees of freedom available in the modulation scheme. Therefore, the mapping of the synchronisation specific data on to the SSC can be expanded to allow the additional signalling of the transmitting Node B chip rate to be added (see GB patent application no. 0122109.2, filed on 13 Sep. 2001 by the same applicant as the present application and entitled "ENCODER AND METHOD FOR EFFICIENT SYNCHRONISATION CHANNEL ENCODING IN UTRA TDD MODE", the content of which is hereby incorporated herein by reference).

Figure 3A:
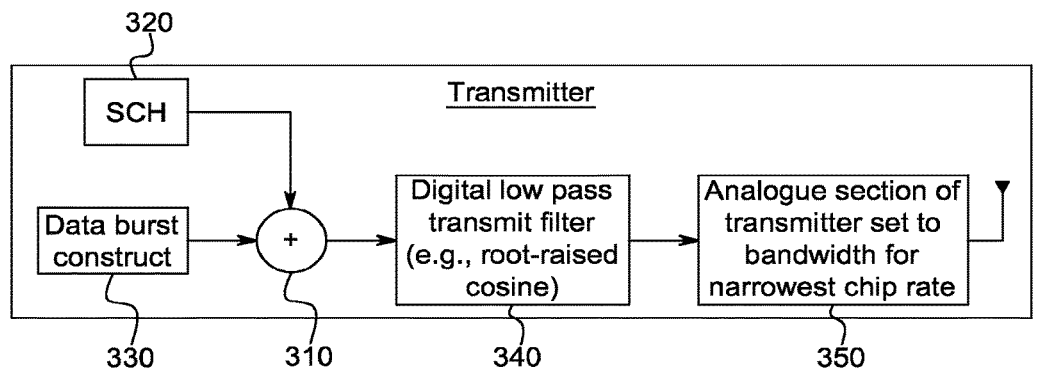
FIGS. 3A and 3B show block schematic diagrams illustrating SCH transmission and reception in a single chip rate system incorporating the invention.
Figure 3B:
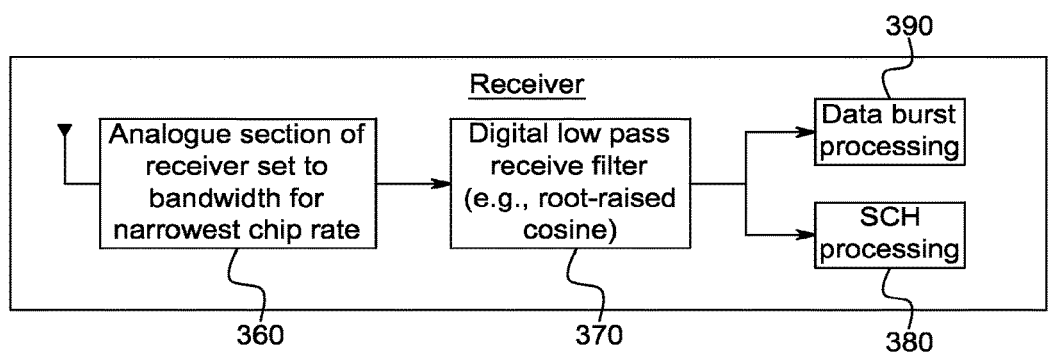

Simplified diagrams of the single chip-rate implementation of a preferred embodiment of the invention are shown in FIGS. 3A and 3B.

In this example, the SCH is treated identically to the rest of the data burst. That is, the SCH is processed by the same transmit and receive filters as the physical channels used to transport the information having the same chip rate.

Thus, as shown in FIG. 3A, in the transmit path of the transmitting Node B a combiner 310 combines SCH information 320 with the appropriate data burst construct 330. The resultant data burst containing the SCH information is filtered in the digital low-pass transmit filter 340 (which may, for example, be of the 'root-raised cosine' type). The analogue section 350 of the transmitter is set to the bandwidth (narrowest) appropriate for the lowest chip rate, and the data burst is passed to the antenna for transmission.

Correspondingly, as shown in FIG. 3B, in the receive path of the receiving UE the analogue section 360 of the receiver is set to the bandwidth (narrowest) appropriate for the lowest chip rate, and performs initial filtering of the data burst received at the antenna. The output of the analogue section 360 is then filtered in the digital low-pass receive filter 370 (which may, like the digital transmit filter 340, be of the 'root-raised cosine' type). The output of the digital low-pass receive filter 370 is processed to recover the SCH information and (as will be explained in greater detail below) to decode the system chip rate information therefrom (as depicted at 380). Since (in this single chip rate case) the decoded system chip rate information does not indicate that the system chip rate is different than the chip rate used for the SCH information (i.e., it indicates that a single chip rate is used), the receive path digital filters remain configured for the single, lowest chip rate for subsequent processing of the data burst (as indicated at 390) and transport channel information as for the SCH information.

Figure 4A:
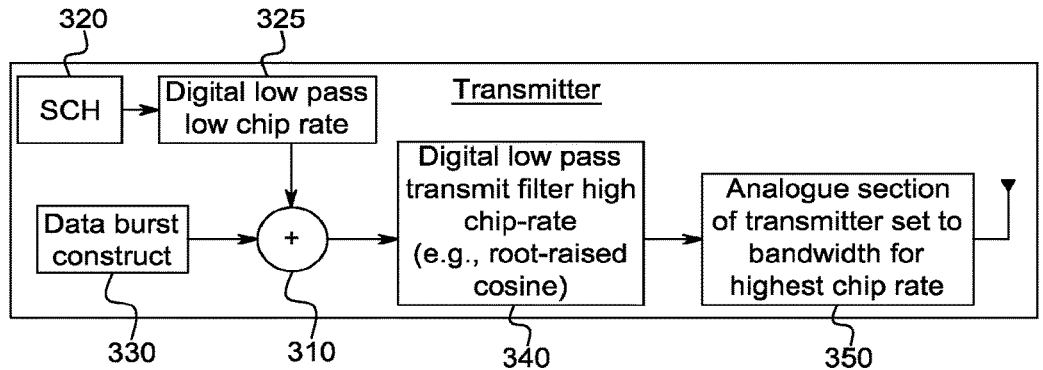
FIGS. 4A, 4B, and 4C show block schematic diagrams illustrating SCH transmission and reception in a multi chip-rate system incorporating the invention.
Figure 4B:
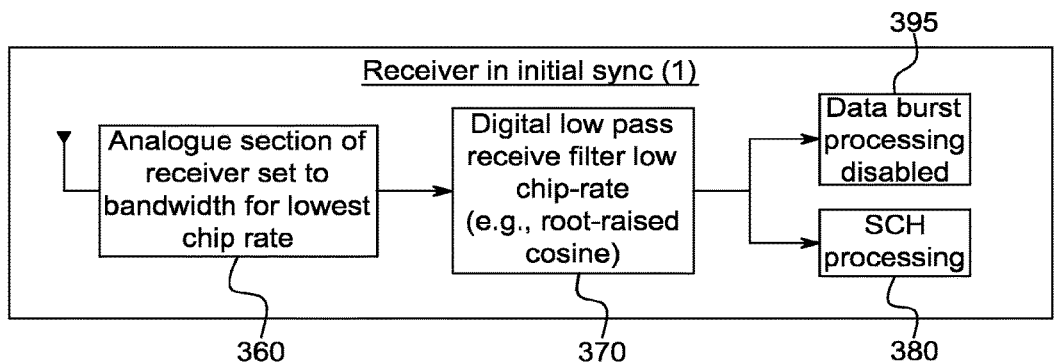
Figure 4C:
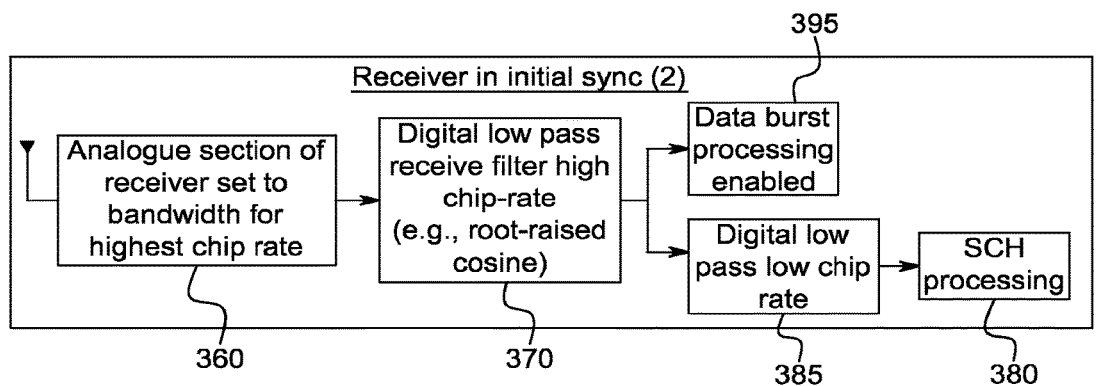

Referring now also to FIGS. 4A, 4B, or 4C, in the case where a different chip-rate is available for the physical channel that is used to transport data, it is necessary to provide different filters (or to differently configure the filter(s)) for the SCH channel and the physical channels used to transport the data. Such different filters, or reconfiguration of the same filter(s), may be implemented as in GB patent application no. 0118414.2, filed on 30 Jul. 2001 by the same applicant as the present application and entitled "DIGITAL FILTER FOR MULTI-RATE COMMUNICATION", the content of which is hereby incorporated herein by reference.

Suppose the chip rate in a multi chip-rate system is given by $$f_c = nf_b; n=1, \ldots, N$$

where $f_b$ is the base chip rate and N is the number of available chip rates in the multi-chip rate system. When a UE is initialised it knows a priori that the chip-rate being used for the SCH is $f_b$, but it does not know the system chip rate being used, $f_c$. In the Node B transmitter, it is necessary to pass the SCH physical channel through a filter (typically a digital fiber) optimised for $f_b$. The physical channels transporting the data are filtered with a (digital) filter optimised for $f_c$. In the analogue section of the Node B transmitter, the filter bandwidth is always equal to $f_c$.

In the receive section of the user equipment, the receiver bandwidth is set to $f_b$ in both the analogue section and digital sections. In this configuration, the physical channels with chip-rate $f_c$ may suffer severe inter-symbol interference when $f_c \neq f_b$. However, the SCH physical channel is received with minimal degradation. It is necessary to use a bandwidth of $f_b$ in the analogue filter and the digital filter in order to apply maximum attenuation to potentially high-power adjacent channel interferers.

With a UE is in this configuration, it is possible to demodulate the SCH channel and decode the data transported by the SSC to determine $f_c$. When initial synchronisation has been achieved, the analogue and digital filters are set to $f_c$.

FIGS. 4A, 4B, or 4C shows the receiver/transmitter implementation of this multi-chip rate scheme.

Thus, as shown in FIG. 4A, in the transmit path of the transmitting Node B a combiner 310 combine SCH information 320 (filtered by a digital low-pass filter 325 set to the low chip rate $f_b$ so as to ensure that the SCH information can be recovered in the receiver by filtering at this chip rate) with the appropriate data burst construct 330. The SCH information is encoded with the desired higher system chip rate $f_c$, as explained in detail in the above-mentioned GB patent application no. 0118414.2. The resultant data burst containing the SCH information is filtered in the digital low-pass transmit filter 340 (now set for the desired high chip rate $f_c$). The analogue section 350 of the transmitter is set to a bandwidth (wider than in the case of FIG. 3A) appropriate for the higher chip rate, and the data burst is passed to the antenna for transmission.

Correspondingly, in the receive path of the receiving UE, in a first state, as shown in FIG. 4B, the analogue section 360 of the receiver is set to the bandwidth (narrowest) appropriate for the lowest chip rate, and performs initial filtering of the data burst received at the antenna. The output of the analogue section 360 is then filtered in the digital low-pass receive filter 370. The output of the digital low-pass receive filter 370 is processed to recover the SCH information and decode the system chip rate information therefrom. It will be appreciated that this initial stage of receive path processing is similar to that shown and described above in relation to the single chip-rate case shown in FIG. 3A. As will be explained further below, at this stage (since the indicated system chip rate $f_c$ is higher than the lowest chip rate $f_b$ used for the SCH information) data burst processing is disabled (as indicated at 395).

In this multi chip-rate case, the system chip rate information decoded from the SCH information indicates the higher chip rate used for transport channel information. Since this indicated system chip rate $f_c$ is higher than the low chip rate $f_b$ used for the SCH information, the receive path is then configured into a second state, as shown in FIG. 4C, in which the analogue section 360 and the digital low pass receive filter 370 are set to bandwidths appropriate for the higher chip rate $f_c$ In this second state, in the receive path of the receiving UE the analogue section 360 of the receiver performs (now at the higher bandwidth appropriate for the higher chip rate $f_c$) filtering of the signals received at the antenna. The output of the analogue section 360 is then filtered (now at the higher bandwidth appropriate for the higher chip rate $f_c$) in the digital low-pass receive filter 370. The output of the digital low-pass receive filter 370 is then processed (i) to recover the data burst information (now enabled, as depicted at 390) and transport channel information at the higher chip rate, and (ii) to further process (after filtering by a digital low-pass filter 385 set to the low chip rate $f_b$ so as to ensure that the SCH information can be recovered in the receiver by filtering at this chip rate) the SCH information (as depicted at 380).

It will be understood that the method, communication unit and communication system for synchronisation for multi-rate communication described also provides improved efficiency in supporting multi-chip rates.

What is claimed is:

1. A method performed by a base station, the method comprising:

transmitting, by the base station, a first signal having a first cell bandwidth in a time slot, wherein the first signal includes a synchronization signal having a second bandwidth, wherein the second bandwidth is based on a lowest potential cell bandwidth, the synchronization signal has a duration less than the first signal, and wherein the first signal includes physical data signals in the first cell bandwidth outside of the second bandwidth of the synchronization signal.

2. The method of claim 1 wherein the lowest potential cell bandwidth is less than the first cell bandwidth.

3. The method of claim 1 wherein the base station is configured to utilize a plurality of cell bandwidths including the first cell bandwidth and the lowest potential cell bandwidth.

4. The method of claim 1 wherein the synchronization signal is a primary synchronization signal.

5. The method of claim 4 further comprising transmitting a secondary synchronization signal in the slot within second bandwidth of the primary synchronization signal.

6. The method of claim 1 further comprising transmitting an indication of the first cell bandwidth within the second bandwidth.

7. The method of claim 1 further comprising transmitting a broadcast channel.

8. The method of claim 1 wherein the first cell bandwidth is utilized by the base station to transmit and receive data using time division duplex.

9. A base station comprising:
an antenna; and
a transmitter, operatively coupled to the antenna, configured to transmit a first signal having a first cell bandwidth in a time slot, wherein the first signal includes a synchronization signal having a second bandwidth, wherein the second bandwidth is based on a lowest potential cell bandwidth, wherein the synchronization signal has a duration less than the first signal, and wherein the first signal includes physical data signals in the first cell bandwidth outside of the second bandwidth of the synchronization signal.

10. The base station of claim 9 wherein the lowest potential cell bandwidth is less than the first cell bandwidth.

11. The base station of claim 9 wherein the base station is configured to utilize a plurality of cell bandwidths including the first cell bandwidth and the lowest potential cell bandwidth.

12. The base station of claim 9 wherein the synchronization signal is a primary synchronization signal.

13. The base station of claim 12 wherein the transmitter is further configured to transmit a secondary synchronization signal in the slot within the second bandwidth of the primary synchronization signal.

14. The base station of claim 9 wherein the transmitter if further configured to transmit an indication of the first cell bandwidth within the lowest potential cell bandwidth of the synchronization signal.

15. The base station of claim 9 wherein the transmitter is further configured to transmit a broadcast channel.

16. The base station of claim 9 further comprising a receiver, operatively coupled to the antenna, wherein the transmitter and the receiver are configured to receive and transmit using time division duplex.

17. A user equipment (UE) comprising:
an antenna; and
a receiver, operatively coupled to the antenna, configured to receive a synchronization signal, wherein the synchronization signal has a second bandwidth, wherein the second bandwidth is based on a lowest potential cell bandwidth, wherein the synchronization signal is received in a time slot, wherein the time slot has a first signal, transmitted by a base station, including the synchronization signal, wherein the first signal has a first cell bandwidth and includes physical data signals in the first cell bandwidth outside of the second bandwidth of the synchronization signal, and the synchronization signal has a duration less than the first signal.

18. The UE of claim 17 wherein the lowest potential cell bandwidth is less than the first cell bandwidth.

19. The UE of claim 17 wherein the synchronization signal is a primary synchronization signal.

20. The UE of claim 19 wherein the receiver is further configured to receive a secondary synchronization signal within the second bandwidth of the primary synchronization signal in the time slot.

21. The UE of claim 17 wherein the receiver is further configured to receive an indication of the first cell bandwidth within the second bandwidth.

22. The UE of claim 17 wherein the receiver is further configured to receive a broadcast channel.

23. The UE of claim 17 further comprising a transmitter, operatively coupled to the antenna, wherein the transmitter and the receiver are configured to receive and transmit using time division duplex.

* * * * *

UNITED STATES PATENT AND TRADEMARK OFFICE
CERTIFICATE OF CORRECTION

PATENT NO. : 10,477,497 B2  
APPLICATION NO. : 15/688296  
DATED : November 12, 2019  
INVENTOR(S) : Paul Howard Page 1 of 1

It is certified that error appears in the above-identified patent and that said Letters Patent is hereby corrected as shown below:

In the Specification

At Column 1, Line 8, between the text reading "Dec. 6, 2010," and "which is a", insert the language --which issued as U.S. Pat. No. 8,396,079 on Mar. 12, 2013,--

At Column 1, Line 7, after the words "This application" insert the language --is a continuation of U.S. patent application Ser. No. 15/001,871 filed Jan. 20, 2016, which issued as U.S. Pat. No. 9,749,973 on Aug. 29, 2017, which is a continuation of U.S. application Ser. No. 13/787,115 filed on Mar. 6, 2013, which issued as U.S. Pat. No. 9,247,511 on Jan. 26, 2016, which--

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*